Patented Apr. 23, 1940

2,198,201

UNITED STATES PATENT OFFICE 2,198,201

STABILIZING FOOD COMPOSITIONS

Sidney Musher, New York, N. Y., assignor to Musher Foundation Incorporated, New York, N. Y., a corporation of New York No Drawing. Application October 7, 1939, Serial No. 298,430

6 Claims. (Cl. 99—150)

This invention relates to retarding oxidative deterioration of food products and particularly of aqueous or water containing food compositions and deals more particularly with retarding rancidity of the oil containing aqueous food compositions in which the oil is present in the discontinuous phase and the water present in the continuous phase.

In accordance with this invention there are utilized the slightly acidified water soluble extracts of the cereal germs and particularly of the de-oiled germs as the antioxygenic materials for addition to the aqueous food compositions.

These cereal germs are desirably in unbleached dry milled and finely divided form and of particular importance are maize and oat germ, these being preferred to the germs removed from barley, wheat and rice.

These germs are removed preferably by subjecting the cereal to a strong current of air in order to loosen the germ from the remainder of the cereal and remove the germ without subjecting the cereal or the germ to any bleaching, or other chemical process which would tend to inactivate its desirable properties.

The cereal germ is preferably subjected to a de-oiling operation which is accomplished preferably by expression of a large proportion of the glyceride oil contained therein and also by extraction with oil solvents, such as with hexane or gasoline, for example, and the glyceride oil content is thereby reduced to about 10% or less.

In the preparation of the germ, some of the bran may be removed along with the germ and, when this is done, the bran and germ combination may be employed for extraction as indicated below.

The raw and unbleached, dry milled, finely divided cereal germ and particularly maize or oat germ should be mixed or agitated thoroughly with a quantity of water, preferably acidified, for a period of about 30 minutes at a temperature of 135° F. The time of agitation may vary from 5 minutes to 1 hour or more dependent upon the fine state of division of the germ, but in order to obtain the maximum yield and the most desirable product, the time period for continuous agitation should be between about 45 minutes and 1 hour.

The temperature of the water at the time of the extraction should not be in excess of about 140° F. to 145° F. in order to avoid solubilization and gelatinization of the starch, protein decomposition and other forms of conversion, which are highly undesirable in the production of the desired extract.

The water temperature should also not be less than about 125° F. to 130° F. in order to obtain the maximum yield of the water soluble antioxygenic substances. A difference of as little as 10° F. in the temperature of the water used for extraction may account for a 50% to 75% loss in the yield of the water extract that is obtained and therefore the most suitable temperature of the water for extraction is about 135° F.

The water used should be substantially free of minerals and desirably free of iron and copper. Preferably, in order to obtain a clear supernatant water containing the extract, the pH of the water should be adjusted to between 4.5 and 6.7 and preferably to 5.5 to 6 by addition of a mineral acid such as hydrochloric, sulphuric or phosphoric, or an organic acid such as acetic, tartaric, citric, etc., or by the addition of acid salts such as acid sulphates or phosphates. This adjustment may take place during or before the extraction.

The maize germ or oat germ flour may be agitated in the water at 135° F. for the 1 hour period. The pH adjustment will also serve to increase the rate at which insoluble material will settle out leaving a clear supernatant water portion containing the extract.

Any quantity of water may be used to produce a free flowing mixture. One part of maize germ flour should preferably be mixed with about 5 parts of water by weight. Other proportions may also be used such as from 4 to 15 parts of water to every 1 part of maize germ flour.

Another very satisfactory method is for the cereal germ to be ground or milled with sufficient water to produce a paste and whereby the cell structure of the germ is so broken into as to permit the maximum solubility of the water extractable substances into the water. Then the pulpy aqueous mass may be pressed or centrifuged or otherwise treated to remove the aqueous solution containing the extract. Preferably the same temperature and acidity are employed as above. The solution may be clarified or filtered or where additional water is added, allowed to settle out.

Where the maize germ-water suspension is allowed to stand for settling out, and after the 1 hour agitation and extraction period, the solution should desirably be cooled by placing it in a jacketed or coiled vat or by running water through cooling coils immersed therein or by adding cold water to the hot maize germ-water suspension, so that the temperature of the water is reduced from 135° F. to from 80° F. to 105° F. and preferably to about 100° F. in order to avoid fermentation during the settling period. The solution thus cooled may then be treated to remove the undissolved starch, fibrous and other cereal germ insoluble portions. This may be accomplished by allowing the solution to settle for from 2 to 12 hours until a substantially clear unfermented supernatant liquid is formed which liquid is removed by decanting, siphoning or filtering.

The solution containing the germ flour may also be subjected to a continuous centrifuging whereby all undissolved material is removed as a continuous operation.

The substantially clear solution thus obtained should desirably be evaporated by vacuum distillation at 135° F. under 25 inches of vacuum, to approximately 25% to 75% solids and desirably to about 65% or 70% solids and to a Baumé of about 37°. After the proper solids content has been reached, the extract should desirably be subjected to superheated steam in the vacuum pan in order to raise the temperature of the extract to about 190° F. to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The concentrated extract may where desired be packed in cans or other containers and sterilized at 220° F. to 250° F. for 10 to 30 minutes.

Where, due to prolonged sterilization or high heat during such sterilization, a coagulation or precipitation is formed resulting in the production of insoluble matter, such precipitate may be filtered or otherwise removed. Distilled or softened water is desirable as the extracting medium and will avoid, to a large degree, such precipitation and coagulation.

The slightly acidified water extract of raw unbleached dry milled maize germ thus obtained will be of dark brown or tan color and will be high in water soluble carbohydrate sugar material and will also contain organic phosphorous and organic nitrogen compounds which appear to be very essential in obtaining the desired antioxygenic action.

There is a substantial difference between the water extract obtained from maize germ flour and that obtained from other cereal germs insofar as appearance and general characteristics are concerned, although they all possess good antioxidant properties and are all substantially starch, fiber and oil free and contain water soluble carbohydrates, which carbohydrates are particularly essential to the proper antioxidant activity when subjected to elevated temperatures in the organic composition to be preserved.

It is not desirable to concentrate the water extract down to in excess of 70% solids in the vacuum pan, as otherwise darkening and caramelization of the extract occur.

Where drying is desirable, the concentrated water extract may be dried on trays, preferably under vacuum and a desirable dried product will be obtained. Drum drying is difficult in view of the mucilaginous nature of the extract by means of which the extract adheres to the drum and cannot readily be scraped off. Spray drying may less preferably be resorted to in view of the oxidation occurring during the spray drying operation.

The maize germ or oat germ should be extracted only once as subsequent extractions will not remove preservative materials satisfactory for use.

The extract thus obtained is substantially free of pro-oxidants normally present in the original cereal germ and which pro-oxidants reduce materially the antioxygenic activity of the unextracted germ.

The preservative effect obtained by the germ extract is quite different from that obtained with lecithin. Lecithin, for example, is substantially inactivated as an antioxidant when heated to 65° C. whereas these extracts retain their full antioxidant properties at temperatures far in excess of 65° C. such as at 100° C. and even as high as 250° C. where they become even more effective when heated in the organic composition to be preserved.

The concentrated dry milled maize germ or oat germ extract obtained in accordance with this invention has wide antioxygenic properties and may be satisfactorily used for the preservation of organic materials subject to oxidative deterioration, but is particularly utilized for aqueous food compositions.

For example, the extracts may be satisfactorily used for curing operations such as a part of the curing ingredients in the curing of fishery products such as herring, mackerel, salmon, etc., and in the curing of meat products such as bacon, hams, etc. The extracts are beneficial for retarding blood oxidation of haemoglobin to maethmoglobin wherein they may be added to sausage, hamburgers, etc. The extracts may also be used in the dairy industry as for addition to milk, cream, ice cream, cream in the manufacture of butter, etc.; for addition of aqueous emulsions containing glycerides, essential and hydrocarbon oils subject to oxidation; in the curing of fruit products and also for canned and frozen fruits to retard oxidative deterioration and discoloration thereof; for fortifying cereals, starches and cereal grasses, and for use in the manufacture of puddings and desserts and in the quenching of coffee.

Less than 5% of the water soluble extract on its solids basis will give the desired preservative effect and in most instances less than 1% of the extract will be sufficient. The extract should desirably be thoroughly dispersed throughout the body of the composition to be stabilized.

EXAMPLE I

To milk susceptible to the development of oxidized flavor was added and thoroughly admixed therein 0.05% of the concentrated water extract of dry milled finely divided unbleached maize germ which had been subjected to expression to reduce the glyceride oil content to about 10%. The maize germ flour was extracted with water at a pH of 5.5, a temperature of 135° F. for 1 hour by using one part of the maize germ by weight to 6 parts of the acidified water. After a settling period the supernatant water portion was removed, filtered, and reduced in a vacuum pan at 135° F. and under 25 inches of vacuum to a total solids content of 70%. The milk containing the concentrated water extract was compared with untreated milk by allowing it to stand at 50° F. and testing at regular intervals for oxidized flavor development. The results are given below, the number of + signs indicating the degree of oxidized flavor present.

|  | 24 hours | 48 hours | 72 hours |
|---|---|---|---|
| Untreated milk | − | ++ | +++ |
| Treated milk | − | − | + |

It has been found that although the extract thus obtained has but little effectiveness when used with pure glyceride oils and fats such as lard, it is extremely effective when used in aqueous materials maintaining the oil globules. The presence of the water extract in the continuous aqueous phase gives extremely marked protection to the fat phase, although when added direct to the fat phase, it is comparatively much less effective.

Even when the extract is added to an aqueous emulsion, and that emulsion subsequently broken as when cream is churned into butter, the protective effect originally exerted upon the emulsion, in this case the cream, is carried with the fat or oil, in this case the butter, to stabilize that fat against oxidative deterioration.

It is particularly desirable in accordance with this invention for the antioxygenic germ extract to be dried and absorbed upon cereal flours, seed flours, starch, sugar or salt, which appear materially to increase or enhance the antioxygenic effect and under which condition the absorbed extract becomes considerably more effective as an antioxidant than where used alone for the aqueous food composition.

Where the antioxygenic extract is dried on sugar, either raw or refined cane or beet sugar may be employed either in crystallized or syrup form, or residues or mother liquors obtained from them. Other sugars upon which the extract may be dried are dextrose, lactose and fructose.

In order to obtain a thorough surfacing of the extract on the individual sugar crystals, the extract may be dried down to about 40% to 70% total solids and then thoroughly mixed with the sugar in the centrifugals and after substantially all of the mother liquor has been removed. The sugar may then where desired be subjected to an elevated temperature in order to remove the balance of the water still remaining in the extract. The enhanced antioxygenic sugar containing the extract will have valuable properties for use in aqueous food compositions and particularly where normally large quantities of sugar are utilized such as for ice cream, sherbets, candies, confections, jams and jellies and for sweetening aqueous food compositions generally, in sugar curing, for beverages and fruit concentrates and fruit juices.

Where salt is employed as the carrier, the cereal germ extract may be applied to the salt as it leaves the kiln and while the salt is at a temperature of about 275° F., mixing thoroughly the extract with the salt so that while the salt is at the elevated temperature, the balance of the water remaining in the extract will be volatilized, or where desired, the salt may be subjected to a further vacuum evaporation after applying and thoroughly admixing the cereal germ extract therethrough.

The extracts may be applied to the sugar or salt in any desired amount using, for example, from 0.5% by weight against the solids weight of the extract as against the weight of the sugar or salt upon which the extract is absorbed to from, for example, 30% of the extract and 70% of the sugar or salt.

In any case, the resultant extract or the resultant extract absorbed upon the sugar or salt is free of cereal germ fibres, starch or oil and other water insoluble components of the cereal germ.

Another carrier that may be employed to increase further the stabilizing effect is powdered skim milk. The extract may be mixed with the milk, preferably skimmed, in concentrated form, and using from 10% to 60% of the extract and 90% to 40% of the milk, based upon their solids weight, and then the ingredients dried together. The drying may be done preferably on a hot roll and the dried film scraped off after drying. Less preferably the mixture may be dried by spraying into a heated chamber.

The skim milk absorbs the gummy characteristics of the extract and permits much easier drying than where the extract is dried alone.

The water soluble extract of the cereal germs absorbed upon salt, sugar or skim milk solids thus obtained is highly desirable for utilization in retarding oxidative deterioration of aqueous food compositions and particularly for oil containing food compositions where the oil occupies the discontinuous phase and water the continuous phase and whereby even though the extract is mixed in the aqueous continuous phase, it nevertheless retards deterioration of the oily discontinuous phase.

Among such oil in water aqueous compositions are included particularly dairy products such as milk, cream and ice cream, and other food products such as mayonnaise, salad dressing, cod liver oil emulsions, mineral oil emulsions, etc.

There are also included the fruit juices and fruit concentrates and the cola type beverages in all of which compositions an essential oil is present as the discontinuous phase in the aqueous continuous phase.

EXAMPLE II

The extract as described in Example I was added to cream containing 35% butterfat in an amount of 0.6% against the butterfat weight of the cream. The cream was then pasteurized at 145° F. for 30 minutes, cooled and churned into butter. The butter was compared in keeping quality with butter prepared from untreated cream by storing at 50° F. and scoring for flavor.

|  | Flavor score after— | |
|---|---|---|
|  | 2 weeks | 4 weeks |
| Butter made from untreated cream | 90 | 89 |
| Butter made from treated cream | 91 | 90.5 |

EXAMPLE III

An antioxygenic crystallized cane sugar was prepared by adding to the sugar at the centrifugals 1.7% of the 60% total solids concentrated acidified (pH 6.0) water extract of dry milled comminuted wheat germ, the germ having been extracted at 135° F. for 1 hour, filtered, and the soluble acidified water portion evaporated in a vacuum pan at 135° F. This sugar was used in the manufacture of strawberry ice cream and compared in keeping quality with strawberry ice cream made with ordinary cane sugar by tasting for oxidized flavor development at regular intervals, the number of plus signs indicating the degree of oxidized flavor present.

|  | Oxidized flavor after— | |
| --- | --- | --- |
|  | 3 weeks | 6 weeks |
| Ice cream containing untreated sugar | + | +++ |
| Ice cream containing treated sugar | − | + |

It is particularly surprising to find that the water soluble extract is even more effective when added to the aqueous continuous phase of a water containing oxidizable food composition to protect the discontinuous oil phase contained therein than either the original unextracted cereal germ or the cereal germ extract when added direct to the oil which is subsequently dispersed in the aqueous continuous medium.

The aqueous food compositions particularly to be stabilized in accordance with this invention contain 20% or more of water and generally as much as from 50% to 95% of water.

Among such products are included the dairy products, curing brines as used in the curing of meat products including bacon, hams and pork, poultry products, fishery products such as mackerel, sardines and salmon, fruits including olives, peaches and pears, beverages and candies or confections.

With regard to those aqueous food compositions not necessarily existing in emulsified form and for the most part fat free, such as egg albumin or egg white, and fruits, the water extract of the cereal germs may also be advantageously employed to retard protein decomposition and essential oil oxidation in them.

The antioxygenic extract may also be employed for addition to water that is normally used in the processing of food compositions, such as for addition to the water used in the quenching of coffee, for addition to brines that are used in brining or curing operations, such as in the brining of olives, meats, fish, fruits, vegetables, for addition with water in the manufacture of sausage, for manufacture into ice or ices, and for addition to water in the manufacture of doughs for bakery products.

It has furthermore been surprisingly found that where the extract is subjected to an elevated temperature at the time of use in connection with the aqueous food composition requiring stabilization and in the presence of such aqueous food composition, a marked acceleration of the stabilizing process is obtained, particularly when the extract has been absorbed upon a carrier, such as sugar.

The extract in the presence of the oxidizable food composition should desirably be subjected to a temperature of 145° F. or more and most desirably of from 165° F. to 250° F. or more.

For example, where the concentrated water extract of finely divided unbleached dry milled maize germ press cake is added to cream, and that cream subjected to an elevated temperature such as to 175° F. for 5 minutes, the effectiveness of the extract is considerably improved over its effectiveness when added to the same cream where the cream is not heated with the extract. In addition, the butter made from that heat treated cream containing the extract is similarly materially improved in keeping quality.

Example IV

Cream A

The maize germ extract prepared as described in Example I was added to and admixed in cream containing 35% butterfat in an amount of 0.2% and the cream then heated to 180° F. for 5 minutes and cooled.

Cream B

The cream was heated to 180° F. for 5 minutes, cooled, and then 0.2% of the maize germ extract was added to and admixed in the cream.

Both creams were tested for oxidized flavor after storage at 50° F.

|  | Degree of oxidized flavor after— | | |
| --- | --- | --- | --- |
|  | 48 hours | 72 hours | 96 hours |
| Cream A | − | ± | + |
| Cream B | + | ++ | ++ |

The application of the elevated temperature should be made to the aqueous food composition after the extract has been added to it and thoroughly dispersed therein. It is not desirable nor can the desired effect be obtained by heating the concentrated extract alone and then adding such heated extract to the oxidizable aqueous material. When the extract is heated alone, no improvement is obtained over the unheated extract and frequently a reduction in antioxygenic activity is observed.

The extract thus obtained may be utilized for addition to milk, ice cream, condensed or evaporated milk, frozen cream, cream cheese or other form of dairy products, fruit juices, fruit concentrates, beverages, vegetable juices, liquid egg yolk, egg white, soups, tomato juice, tomato catsup, jams and jellies, desserts and similar products and particularly where the food composition is subsequently subjected to an elevated temperature of at least 145° F. to 250° F. or higher.

Any desired amount of the extract may be employed such as from 0.005% to 5% by weight of the concentrated extract, although desirably less than 1% is employed and will give the desired antioxygenic effect.

The residue obtained after removal of the extract may be dried by heating under vacuum to 125° F. or by passing over hot plates or other means. After drying, the residue has excellent value for animal feed or for normal feed purposes where the water soluble portion removed as an extract would not be a requisite. The dried residue remaining still retains some antioxidant properties when used in connection with pure oils and fats such as with lard, cottonseed oil, soya bean oil, tallow, cod liver oil, etc.

In addition to the use of a slightly acidified water as the solvent for extracting the cereal germ, a small quantity, desirably between about 10% and 70%, of alcohol, such as methyl or ethyl alcohol, may be added to the water, acidified to a pH of between about 4.5 and 6.7, and then utilized as the solvent whereby specially desirable characteristics are given to the resultant extract.

The extracts obtained in accordance with this invention may also be utilized for addition to alcoholic beverages, such as to whiskey, brandy, wine, gin and cordials. Of particular importance is the utilization of the concentrated water soluble extract obtained from maize germ for addition to bourbon or corn whiskey after manufacture thereof; the concentrated extract obtained from rye germ for addition to rye whiskey; and that obtained from barley for addition to Scotch whiskey.

In the utilization of these germs for extraction, the cereal may be degerminated by the dry process as indicated above, the germs extracted in the aforesaid manner, and the germ residues following extraction may be added back to the fermentation tanks along with the degerminated portion of the cereals.

The addition of the cereal germ extracts in this manner to the finished alcoholic beverages enhances their value materially and, by these means, highly desirable, novel, stabilized beverages are obtained.

This application is a continuation in part of application, Serial No. 249,990, filed January 9, 1939, which has matured into Patent No. 2,176,027.

Having described my invention, what I claim is:

1. A process of retarding oxidative deterioration in food compositions which comprises extracting unbleached cereal germs selected from the group consisting of maize germ and oat germ with slightly acidified water, adding a small amount of said extract to the food composition, and then heating to a temperature in excess of 250° F.

2. A process of retarding oxidative deterioration in food compositions which comprises extracting unbleached cereal germs with a solvent selected from the group consisting of slightly acidified water and alcohol, adding a small amount of said extract to the food composition and then heating to a temperature in excess of 145° F.

3. A process of retarding oxidative deterioration in food compositions which comprises extracting dry milled unbleached cereal germs with a solvent selected from the group consisting of slightly acidified water and alcohol, adding a small amount of said extract to the food composition, then heating to in excess of 145° F.

4. A process of retarding oxidative deterioration in food compositions which comprises extracting unbleached cereal germs with a solvent selected from the group consisting of water and alcohol, concentrating said extract, adding a small amount of said extract to the food composition, and then heating to a temperature in excess of 145° F.

5. A process of retarding oxidative deterioration in food compositions which comprises extracting unbleached cereal germs with water having a pH between 4.5 and 6.7, concentrating said extract, adding a small amount of said extract to the food composition and then, heating to in excess of 145° F.

6. A process of retarding oxidative deterioration in food compositions which comprises extracting dry milled, unbleached, de-oiled cereal germs with slightly acidified water, concentrating said extract, adding a small amount of said extract to the food composition and then heating to a temperature in excess of 145° F.

SIDNEY MUSHER.